Feb. 22, 1927.

J. SHERIDAN 1,618,556

MEANS FOR MANIPULATING DETACHABLE RIMS OF PNEUMATIC AND SOLID TIRES

Filed Nov. 17, 1925

INVENTOR:
John Sheridan.
BY
Wm. Ewart Doyle,
Patent Attorney.

Patented Feb. 22, 1927.

1,618,556

UNITED STATES PATENT OFFICE.

JOHN SHERIDAN, OF MEATH, IRISH FREE STATE.

MEANS FOR MANIPULATING DETACHABLE RIMS OF PNEUMATIC AND SOLID TIRES.

Application filed November 17, 1925, Serial No. 69,620, and in Great Britain September 9, 1925.

This invention relates to improvements in means for manipulating detachable rims of pneumatic and solid tires, the object being to provide against undue distortion or bending out of shape of the rim while it is being outwardly expanded temporarily with a view to its manipulation when removing it from a tire.

In the prior art, it is customary to provide a detachable rim with a gap piece between the free ends and to provide a hole in each free end or provide each free end with a lug whereby the rim may be temporarily expanded for removal of the gap piece prior to drawing the free ends together in contracting the rim for removal of the tire whether pneumatic or solid tire. In such manipulation, there was no support under the rim while being expanded and contracted so that the rim was thereby easily bent out of shape or distorted which put undue strains on the rim and prevented accurate refitting of the rim.

In this construction a turnbuckle provided with right and left hand screws was provided with the corresponding screws having opposite hooked ends to engage said holes or for attachment to said lugs, was provided for the purpose of expanding and contracting the detachable rim. To eliminate the foregoing disadvantages, according to my present invention, the means for manipulating detachable rims of pneumatic and solid tires, consists of a detachable member which is shaped to fit against portion of the inner circumference of the usual detachable rim when the latter is removed from the wheel, and on this detachable member there is positioned a pair of opposing members which are also shaped to fit against the opposite portions of the inner circumference of the detachable rim, the invention being further characterized in that said pair of opposing members is capable of being outwardly expanded with the free ends of the detachable rim, suitable means being provided for expanding the pair of opposing members in opposite directions on the detachable member, the construction, arrangement and operation being such that a lifting jack or other suitable tool such as a turnbuckle with left and right hand screws may be employed for outwardly displacing the pair of opposing members to temporarily expand the rim for manipulating purposes so that the rim is not unduly bent or distorted in this operation.

My said invention is more fully described hereinafter with reference to the accompanying explanatory drawing; and the same reference numbers are used for the same parts throughout.

Figure 1:
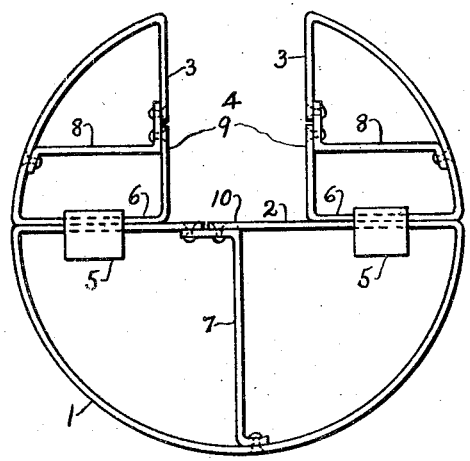
Figure 2:
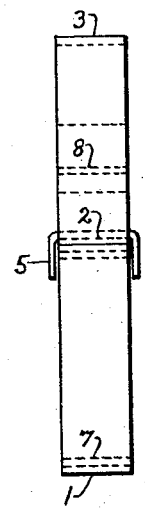

In the drawing, Fig. 1 shows a suitable example of the means for manipulating detachable rims of pneumatic and solid tires, of which a front view is shown in Fig. 2.

The detachable member 1 is shaped to fit against a portion of the inner circumference of the usual detachable rim for the purpose of maintaining the shape of the latter to the greatest possible degree, there being slidably positioned on the base 2 of the member 1 a pair of opposing members 3 which are also shaped to fit against the opposite portions of the inner circumference of the detachable rim. A gap 4 is formed between the members 3 whereby the latter may be expanded by suitable means such as a turnbuckle or lifting jack placed within the gap 4 and whereby the rim gap piece may be readily removed in the space formed by the gap 4. Means are provided for movably securing the members 3 on the detachable member 1; and such means might conveniently consist of detachable U-shaped members 5 which are adapted to straddle the members 3 on the detachable member 1 in the manner shown in the drawing, this arrangement readily permitting of the members 3 being removed from the base 2 formed by the member 1 so that the apparatus may be conveniently stored in a small space or readily assembled within the detachable rim. The base or pedestal 2 is preferably formed as shown; and on each of the members 3 there is also formed a corresponding base or pedestal 6 adapted to be slidden on the base 2 for the purpose specified. For simplicity, cheapness and efficiency in construction, the detachable member 1 and the opposing members 3 are formed as individual one-piece reinforced frame or skeleton like members as shown in Fig. 1, the member 1 being reinforced by the stay 7 and the members 3 being reinforced by the stays 8 so that the stay 7 forms a rigid support for a vertically disposed lifting jack or turnbuckle which when horizontally disposed is resisted by the stays 8.

In operation, when the detachable rim is removed with its tire from the wheel, the member 1 is placed within it so as to lie closely against half its inner circumference. The members 3 are then placed on top of the base 2 to form a gap 4 at each side of the usual gap piece in the rim. The standard lifting jack supplied with the car or a turnbuckle or other suitable tool is now inserted in horizontal fashion and is manipulated to press the members 3 at the points 9 in an outward direction which expands the rim sufficiently for removal of the gap piece through the gap 4 while at the same time the members 3 and 1 serve to maintain the rim in its best possible form during this operation so that the rim will be in good shape and will be undamaged when reinserting the gap piece when a new tire has been put on the rim. When the gap piece is removed, the lifting jack or turnbuckle may be slackened off gradually and at the same time the free ends of the rim may be likewise contracted or brought together when supported by the members 3 for removal of the tire or for replacement thereof. When the gap piece is in poistion but is not exactly driven home to form a continuous inner circumference of the rim, the lifting jack or turnbuckle may be vertically disposed to rest at the point 10 on the base 2, and it may then be manipulated to press the gap piece into position. When this operation is performed, the members 1 and 3 are removed as also the U-shaped members 5 and the apparatus may then be stored in a small space or compartment for future use.

Where the detachable rim has only one division with abutting free ends, the said apparatus may be similarly manipulated for the purpose set forth.

Having described my invention, I claim:—

1. In means for manipulating detachable rims of pneumatic and solid tires, of the kind described, a detachable member shaped to fit against portion of the inner circumference of the detachable rim, on said detachable member a pair of opposing members shaped to fit against opposite portions of said inner circumference of said detachable rim and capable of being outwardly expanded with the free ends of the detachable rim, means for movably securing said pair of opposing members on said detachable member consisting of detachable U-shaped members adapted to straddle said opposing members and said detachable member.

2. In means for manipulating detachable rims of pneumatic and solid tires, of the kind described, a detachable member shaped to fit against portion of the inner circumference of the detachable rim, on said detachable member a pair of opposing members shaped to fit against opposite portions of said inner circumference of said detachable rim and capable of being outwardly expanded with the free ends of the detachable rim, on said detachable member a base or pedestal, on each of said opposing members a corresponding base or pedestal adapted to be slidden on the first stated base.

Signed by me this 6th day of November, 1925.

JOHN SHERIDAN.